(12) United States Patent
Voeller

(10) Patent No.: US 12,188,845 B1
(45) Date of Patent: Jan. 7, 2025

(54) SYSTEM AND METHOD FOR CAPTURING TIRE SIDEWALL DATA FROM A MOVING VEHICLE

(71) Applicant: Hunter Engineering Company, Bridgeton, MO (US)

(72) Inventor: David A. Voeller, St. Louis, MO (US)

(73) Assignee: Hunter Engineering Company, St. Louis, MO (US)

(*) Notice: Subject to any disclaimer, the term of this patent is extended or adjusted under 35 U.S.C. 154(b) by 456 days.

(21) Appl. No.: 17/644,469

(22) Filed: Dec. 15, 2021

Related U.S. Application Data

(60) Provisional application No. 63/126,835, filed on Dec. 17, 2020.

(51) Int. Cl.
| | |
|---|---|
| *G06V 30/14* | (2022.01) |
| *G01B 11/22* | (2006.01) |
| *G01B 11/27* | (2006.01) |
| *G01M 17/02* | (2006.01) |
| *G06T 5/40* | (2006.01) |
| *H04N 7/18* | (2006.01) |
| *H04N 9/64* | (2023.01) |
| *H04N 9/76* | (2006.01) |
| *H04N 23/12* | (2023.01) |

(52) U.S. Cl.
CPC .......... *G01M 17/027* (2013.01); *G01B 11/22* (2013.01); *G01B 11/272* (2013.01); *G06T 5/40* (2013.01); *G06V 30/14* (2022.01); *H04N 7/188* (2013.01); *H04N 9/646* (2013.01); *H04N 9/76* (2013.01); *H04N 23/12* (2023.01)

(58) Field of Classification Search
CPC ..... G01M 17/027; G01M 17/06; G01B 11/22; G01B 11/272; G06T 5/40; G06V 30/14; H04N 7/188; H04N 9/646; H04N 9/76; H04N 23/12
See application file for complete search history.

(56) References Cited

U.S. PATENT DOCUMENTS

| | | |
|---|---|---|
| 9,025,853 B2 | 5/2015 | Noyel et al. |
| 9,110,032 B2 | 8/2015 | Farley, III et al. |
| 9,953,411 B2 | 4/2018 | Bourgeois et al. |
| 10,697,766 B1 | 6/2020 | Dorrance et al. |

(Continued)

*Primary Examiner* — Ross Varndell
*Assistant Examiner* — Dustin Bilodeau
(74) *Attorney, Agent, or Firm* — Sandberg Phoenix & von Gontard P.C.

(57) ABSTRACT

A drive-through vehicle inspection system with a method for acquiring information from markings on tire sidewall surfaces of a moving vehicle. As the vehicle passes through the inspection system, sets of colored light sources, disposed at different relative orientations on opposite lateral sides of the vehicle, illuminate each passing wheel, enabling optical imaging systems associated with the opposite lateral sides of the inspection lane to acquire color images of the illuminated tire sidewall surfaces. Acquired color images are passed to a processing system and separated into individual red, green, and blue color channels for image processing. The processed output from each color channel is recombined by the processing system into a synthesized grayscale image highlighting and emphasizing markings present on the tire sidewall surfaces for evaluated by an OCR algorithm to retrieve tire identifying information.

21 Claims, 5 Drawing Sheets
(4 of 5 Drawing Sheet(s) Filed in Color)

(56) References Cited

U.S. PATENT DOCUMENTS

| | | |
|---|---|---|
| 10,803,340 B2 | 10/2020 | Grunzinger, Jr. et al. |
| 2011/0018999 A1* | 1/2011 | Joly ...................... G01B 11/24 |
| | | 348/148 |
| 2012/0242824 A1* | 9/2012 | Takahashi .......... G01B 11/0608 |
| | | 348/86 |
| 2013/0266189 A1 | 10/2013 | Vinciguerra et al. |
| 2016/0127625 A1* | 5/2016 | Hanel ...................... H04N 7/18 |
| | | 348/148 |
| 2018/0299352 A1 | 10/2018 | Rose et al. |
| 2021/0101414 A1* | 4/2021 | Zoken ................... G06T 7/0006 |
| 2022/0409057 A1* | 12/2022 | Valbusa ................. G06V 10/28 |

* cited by examiner

SYSTEM AND METHOD FOR CAPTURING TIRE SIDEWALL DATA FROM A MOVING VEHICLE

CROSS-REFERENCE TO RELATED APPLICATIONS

The present application is related to, and claims priority from, U.S. Provisional Patent Application Ser. No. 63/126,835 filed on Dec. 17, 2020, and which is herein incorporated by reference.

STATEMENT REGARDING FEDERALLY SPONSORED RESEARCH

Not Applicable.

BACKGROUND OF THE INVENTION

The present application is related to drive-through vehicle inspection systems, and in particular to an apparatus and method for non-contact acquisition of data from tire sidewall markings on the wheel assemblies of a moving vehicle passing through a vehicle inspection system, from which information unique to each wheel assembly and/or vehicle is identified.

When a vehicle drives through a vehicle inspection system, such as a tire tread depth measurement system, or a wheel alignment audit system, identification of the vehicle-in-motion enables the inspection system to recall relevant vehicle specifications and provide reports containing vehicle-specific results. A conventional method for the identification of a vehicle-in-motion captures an image of the vehicle's license plate on a front face or rear face, as the vehicle passes through a field of view of the inspection system. The image is reviewed by a processing system to identify alpha-numeric characters comprising the presumably unique license plate, which are then used to retrieve information from an indexed database of vehicle identifying information. If matching license plate information is present in the indexed database, corresponding data for the identified vehicle is retrieved and used by the processing system, together with any inspection results, to generate a vehicle inspection report. Often, information retrieved from an indexed database of vehicles is limited to basic vehicle parameters, such as make, model, and year of manufacture, and does not include relevant details such as the vehicle's trim level or wheel rim and tire dimensions.

During manufacture, vehicle tires are typically marked with identifying information on the sidewall surfaces by either embossed, or raised, alpha-numeric characters and/or symbols. Embossed or raised markings are integrated into the mold from which the tire is produced, and are not typically unique to each individual tire. Rather, the embossed or raised markings are representative of tire characteristics (dimensions, load index, speed rating, etc.), manufacture identifying information, or tire batch required DOT codes. During a vehicle inspection, this information is useful to determine if the tires currently installed on a vehicle match the original manufacturer specified tire size, and if the tires are properly mounted for an intended direction of rotation. A review of the embossed or raised markings can further determine if a set of tires mounted on a vehicle satisfy seasonal legal requirements, if any tire in the set is subject to a recall, and if options are available for the replacement of a tire in if an inspection reveals excessive wear or damage.

Accordingly, it would be advantageous to provide a drive-through vehicle inspection system, such as a tire tread depth measurement system, or a vehicle wheel alignment audit system, with a non-contact method and apparatus for capturing information from tire sidewall surfaces on a vehicle moving through the inspection system, enabling intelligent decisions to be made related to the vehicle tires.

BRIEF SUMMARY OF THE INVENTION

Briefly stated, the present invention provides a drive-through vehicle inspection system with an apparatus and method for acquiring information from markings on tire sidewall surfaces of a moving vehicle. As the vehicle passes through the inspection system, sets of colored light sources each having a different dominant color and disposed at different relative orientations on opposite lateral sides of the vehicle, momentarily illuminate each passing wheel, enabling optical imaging systems associated with the opposite lateral sides of the inspection lane to acquire a set of color images of the illuminated tire sidewall surfaces. Each acquired color image is passed to a processing system and is separated into individual red, green, and blue color channels for image processing. The processed output from each individual color channel is recombined by the processing system into a synthesized grayscale image highlighting and emphasizing markings present on the tire sidewall surfaces. Each synthesized grayscale image is evaluated by an optical character recognition algorithm within the processing system to identify and decode visible markings, which are subsequently parsed to retrieve tire identifying information.

In one embodiment, the placements and orientations of the colored light sources in the sets on each lateral side of the vehicle are selected to illuminate the wheel surfaces along associated illumination axes oriented at an angle between 45-65 degrees relative to an axis of rotation for the wheel assembly. An associated optical imaging sensor is disposed to receive light reflected from the wheel surfaces parallel to the wheel assembly's axis of rotation.

In one embodiment, each set of colored light sources includes at least one blue light source, at least one green light source, and at least one red light source. The light sources are selected to have a peak spectral power output which is matched to a peak spectral responsiveness for a corresponding color channel of the associated optical imaging system.

In one embodiment, each set of colored light sources includes at least one blue light source having a peak spectral power output between 455 nm and 475 nm, at least one green light source having a peak spectral power output between 515 nm and 535 nm, and at least one red light source having a peak spectral power output between 615 nm and 635 nm.

In one embodiment, the optical imaging sensors on opposite lateral sides of the inspection lane are configured to acquire at least one image of each passing wheel assembly on a corresponding lateral side of the vehicle while illumined by an associated set of colored light sources, capturing within a field of view, substantially all of an associated tire outside sidewall surface.

In another embodiment, each colored light source in a set is triggered by a position of a passing wheel assembly to provide momentary illumination. While the wheel assembly is momentarily illuminated by the multiple colored light sources, the associated optical imaging sensor is triggered to acquire an image of an observed field of view encompassing substantially all of the illuminated outside tire sidewall surface. A processing system operatively coupled to the optical imaging sensor receives the resulting image data for processing and optical character recognition of the tire sidewall markings.

In a further embodiment, the drive-through vehicle inspection system incorporating the optical imaging system for acquisition of information from tire sidewall markings is a drive-over tire tread depth measurement system, a drive-through vehicle wheel alignment audit system, or a combination of a drive-through vehicle wheel alignment audit system and a drive-over tire tread depth measurement system.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
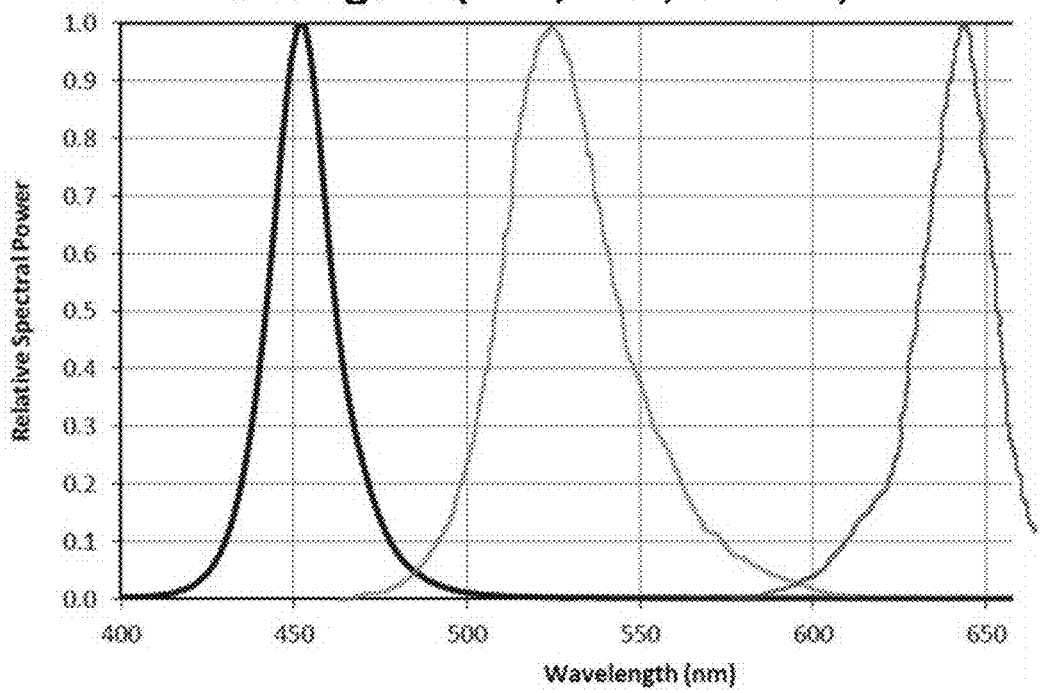
FIG. 1 is a plot of the spectral output for a set of colored light sources employed by a system of the present disclosure to illuminate a passing wheel assembly.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

The present invention enables a drive-through vehicle inspection system to acquire information from tire sidewall markings on the wheels 15 of a moving vehicle 10 passing through an inspection lane 20. Generally, the inspection lane 20 is configured for a vehicle 10 to traverse in a longitudinal direction, providing space for various instrumentation along either lateral side, as well as on (or in) the floor surface over which the vehicle 10 passes, and/or suspended from the ceiling above the vehicle pathway. Exemplary vehicle inspection systems and lane configurations for acquiring vehicle measurements associated with wheel alignment and tire tread depth can be seen in U.S. Pat. No. 10,803,340 B2 to Grunzinger, Jr. et al., and U.S. Pat. No. 10,697,766 B1 to Dorrance et al., both of which are herein incorporated by reference.

To acquire images of the tire sidewall surfaces from the moving vehicle 10 with sufficient clarity and contrast for accurate optical character recognition, the tire sidewall surfaces must be adequately illuminated. In one embodiment of the present disclosure, sets of illumination source 100L, 100R are disposed on each lateral side of the vehicle inspection lane 20, and function cooperatively with associated optical imaging systems 102L, 102R to capture individual images of illuminated wheel assemblies 15, from which tire sidewall marking are identified and evaluated.

Preferably, the sets of illumination sources 100L, 100R each include multiple colored light sources, such as arrays of individual LEDs optimized to emit light within defined optical bands. Each time a wheel assembly 15 on a passing vehicle 10 reaches a predetermined position within the inspection lane 20, the colored light sources 100L, 100R are momentarily activated in response to a trigger at least once, generally for less than 200 ms, to illuminate the tire sidewall surfaces. The trigger mechanism can be any suitable means for generating a signal when a wheel assembly it is at the predetermined position within the inspection lane 20, and may be included as an element of another vehicle inspection system present within the inspection lane 20, such as a wheel alignment inspection system, a drive-over tire tread depth measurement system, or a drive-over vehicle weight measurement system. Similarly, a simple stand-alone trigger mechanism such as a drive-over switch, optical interrupter switch, or optical image recognition system programmed to recognize the presence of a wheel within a field of view may be utilized.

Once triggered, each set of colored light sources 100L, 100R on opposite sides of the vehicle is momentarily activated simultaneously when the vehicle reaches the predetermined position, or alternatively, is momentarily activated sequentially in order to reduce a load applied to a power supply for the system. The use of momentary illumination substantially reduces or eliminates motion blur from acquired images of the illuminated wheel assemblies 15, and allows for the LED lights to be operated in an overdriven state to generate increased light output without suffering damaging effects from rapid heating. Concurrent with each momentary activation of the set of light sources 100L, 100R, the associated imaging system 102L, 102R is triggered to acquire a Bayer-encoded RGB image of the illuminated wheel assembly. Depending upon the wheel size, vehicle speed, and timing, an entire tire sidewall surface can be captured in a single image, or in a sequence of images. Partial portions of a tire sidewall surface captured in a sequence of images, at slightly differing rotational positions of the wheel assembly, can be digitally merged using image processing techniques to generate a composite image of the tire sidewall surface.

To capture images of the tire sidewall surface having sufficient quality for analysis by an optical character recognition algorithm, the associated imaging system 102L, 102R is preferably positioned with an optical axis orthogonal to an outer surface plane of the wheel assembly, within +/−6.0" of the wheel assembly axis of rotation AR at the time of image acquisition, and at a distance of less than 3.0' from the wheel assembly 15 outboard surfaces.

Figure 2:
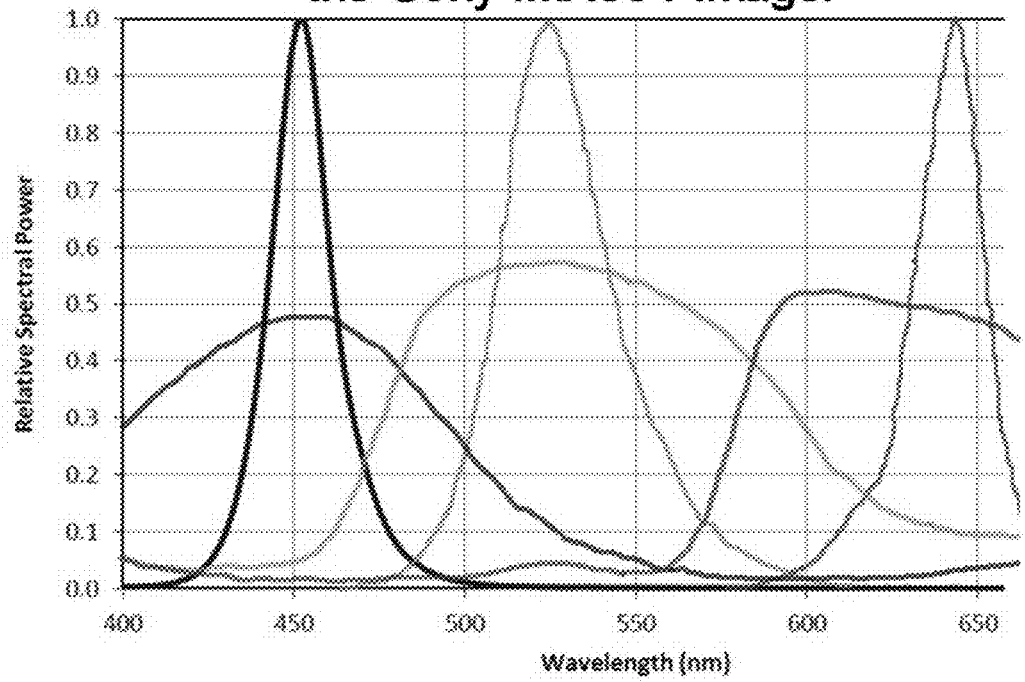
FIG. 2 is a plot of the spectral outputs shown in FIG. 1 superimposed on a plot of the spectral response curves for an exemplary imaging sensor utilized by the system of the present disclosure.

As shown in FIGS. 1 and 2, the sets of colored light sources 100L, 100R, each include a plurality of light sources having different peak spectral power outputs matched to the spectral response sensitivity of the associated imaging system. In an exemplary embodiment, each set of colored light sources includes one blue LED light source 100Lb, 100Rb having a peak spectral power output between 455 nm-475 nm, one green LED light source 100Lg, 100Rg having a peak spectral power output between 515 nm-535 nm, and one red LED light source 100Lr, 100Rr having a peak spectral power output between 615 nm-635 nm. Positioning the individual light sources of a set 100L, 100R in spaced arrangements on each side of the inspection lane provides color illumination directed towards the wheel assembly 15 outboard surfaces from a corresponding number of separate orientations relative to the predetermined position of the wheel assembly 15 at the moment of illumination and/or image acquisition. To enhance an illumination of edge features on the tire surface, and to create well defined shadows, it is preferable that the light sources in each set 100L, 100R be oriented to illuminate the wheel assembly 15 outboard surface from equidistantly spaced non-orthogonal angles, such as separated by 120 degrees of rotation about the wheel assembly axis AR. However, such equidistantly spaced separation may not be readily achieved in a vehicle inspection lane 20, due to the presence of the floor surface.

Figure 3:
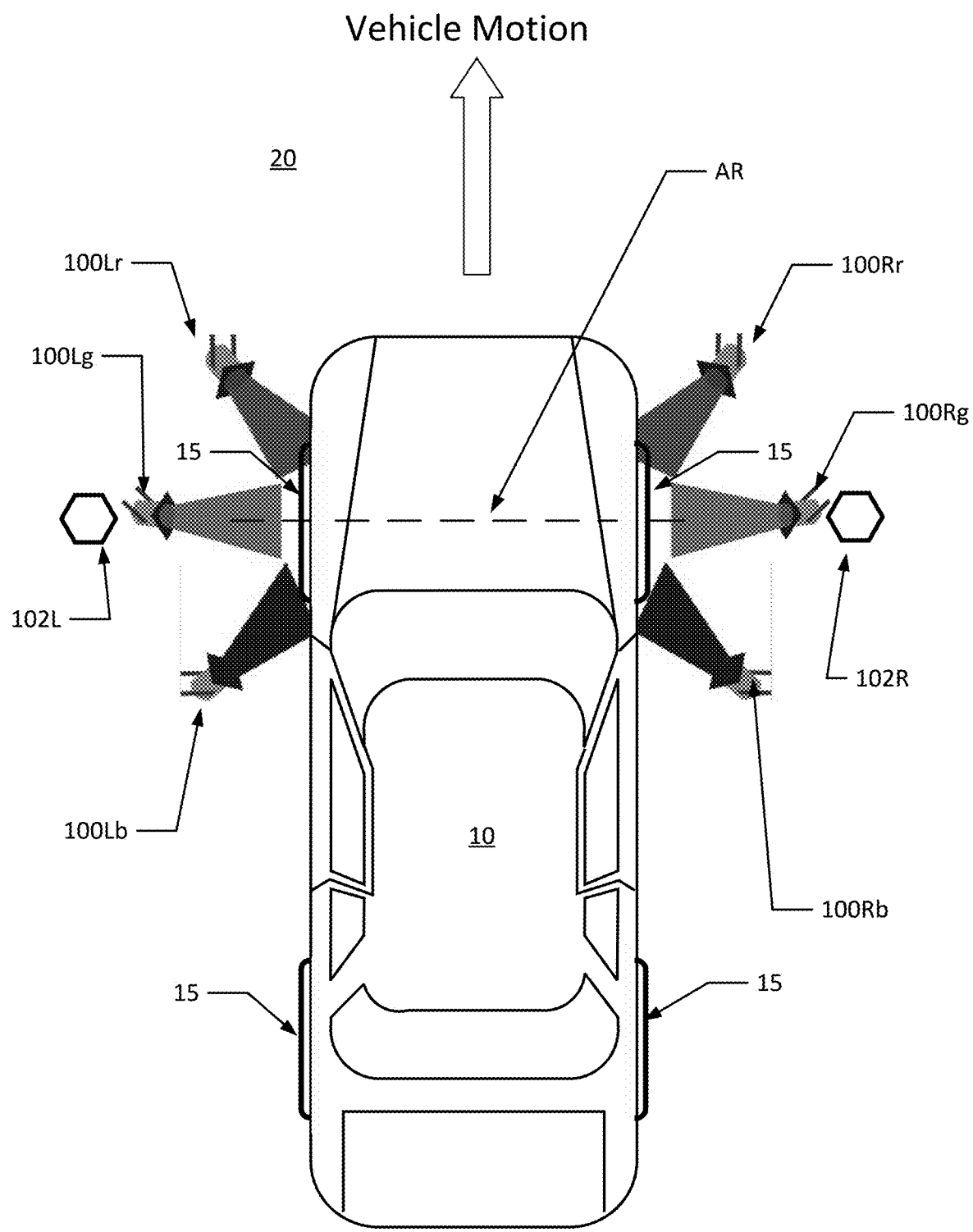
FIG. 3 is a plan view of a vehicle moving through an inspection lane wherein sets of colored light sources are momentarily activated to illuminate the vehicle wheels as they pass by FIG. 4 is a representation of how a Bayer RGB image is initially processed by the system of the present disclosure to establish three discrete color channel images.

In an exemplary configuration for the set of lights 100L, 100R on each side of a vehicle inspection lane 20, the red light source 100Lr, 100Rr is disposed to be longitudinally forward of the wheel assembly's axis of rotation AR at the moment of illumination, the green light source 100Lr, 100Rg is disposed to be longitudinally rearward of the wheel assembly's axis of rotation AR at the moment of illumination, and the blue light source 100Lb, 100Rb is disposed to be in a vertically elevated position above the wheel assembly's axis of rotation AR at the moment of illumination. The specific order of the colored light sources may be varied from the red-green-blue example, so long as each light source is separated by approximately 90 degrees of rotation about the wheel assembly axis of rotation AR. Each light source 100L, 100R is oriented to project illumination along a projection axis intersecting the wheel assembly 15 outboard surface at an angle oriented between 45-65 degrees relative to an axis of rotation AR for the wheel assembly 15. An associated imaging system 102L, 102R is centrally disposed within each set of colored light sources, such that the images of the wheel assembly surface are captured while each colored light source in the set is simultaneously illuminating the wheel assembly surface from a different spatial orientation. By spatially positioning the colored light sources in the set, regions of the wheel assembly surface which form shadows relative to one colored light source are illuminated by a different colored light source, such as shown in FIG. 3.

Figure 4:
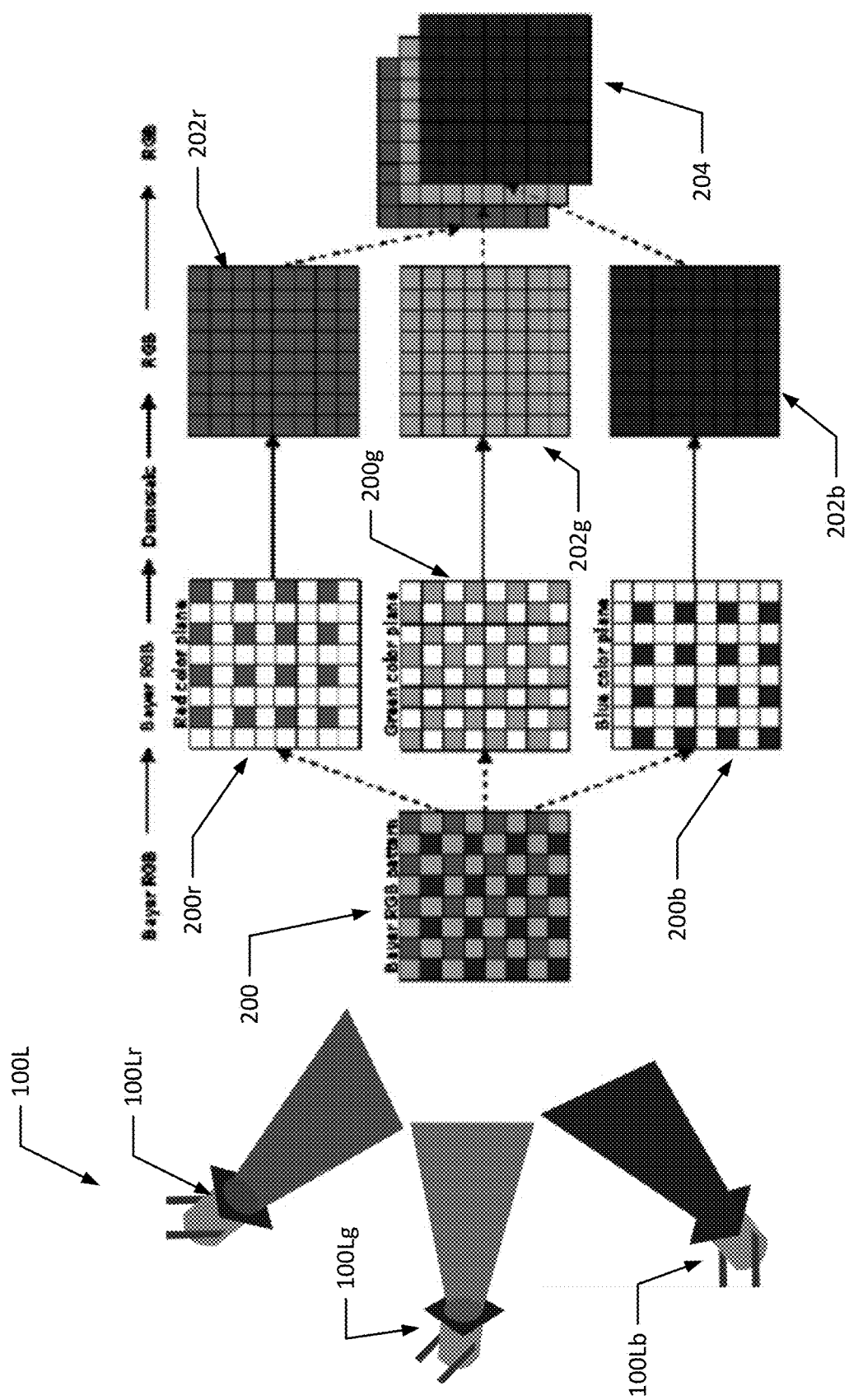

Turning to FIG. 4, a color image 200 acquired by the imaging system 102 associated with the set of the colored lights 100L, 100R consists of a mosaic of red-green-blue pixels, corresponding to an arrangement of color-sensitive elements comprising a 12-bit depth or higher optical imaging element within the imaging system 102. The color image 200 is preferably formed from a BayerRG arrangement of color-sensitive elements, however, other patterns may be utilized without departing from the scope of the invention. In an initial processing stage, the acquired BayerRG image 200 is separated into colored image planes 200r, 200g, 200b, each containing only the image pixel elements representative of a single color of light, i.e., red, green, or blue. Empty image pixel elements within each separated image planes are interpolated or filled to render a complete color image 202r, 202g, 202b for each colored plane. The process of plane separation and interpolation for each color preferably takes place in parallel, and may be done either within a suitably configured processor of the imaging system, or in a suitably configured processor external to the imaging system utilizing RAW image data acquired by the imaging system. Those of ordinary skill will recognize that the processes are not required to be completed in parallel, but may be done serially for each individual color plane without departing from the scope of the invention. The result of the plane separation and interpolation process is an interpolated RGB image 204, effectively providing three individual color images 202r, 202g, 202b of the observed field of view, acquired simultaneously with a single imaging sensor 102.

Figure 5:
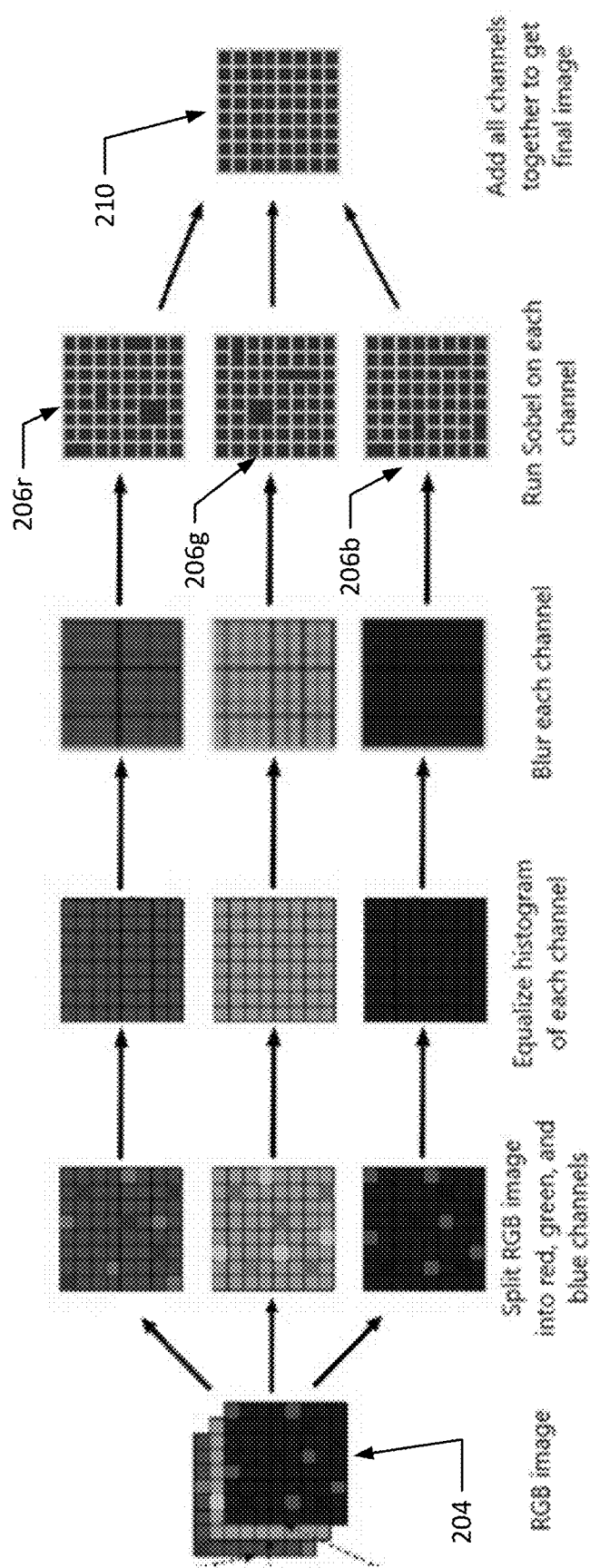
FIG. 5 is a representation of parallel image processing pathways of the system of the present disclosure for individual discrete color images.
Figure 6:
FIG. 6 is an exemplary final image output from the system of the present disclosure for OCR processing.

Once each image plane is rendered, additional image processing is applied as shown in FIG. 5. With each image plane of the interpolated RGB image 204 defining a single color channel, the processing system performs a histogram equalization across each color channel to improve brightness and contrast. To reduce the impact of signal noise amplification during the histogram equalization process, a Contrast Limited Adaptive Histogram Equalization (CLAHE) process is preferably utilized. In the CLAHE process, the source images 202r, 202g, 202b from each color channel are each subdivided into a plurality of portions across which a histogram equalization is applied, rather than equalizing across a single histogram from each color channel. To further reduce the effect of signal noise, each equalized color channel is blurred, and then shaded by application of a Sobel filter to yield output channels 206r, 206g, 206b with enhanced edge features. Finally, each image pixel value is multiplied by a scalar to increase contrast within the individual color channels. The CLAHE process, image blurring, and Sobel filtering for each color channel proceeds in parallel threads within the processing system, as seen in FIG. 5, but may be done sequentially without departing from the scope of the invention. The resulting output channels 206r, 206g, 206b from each individual color channel are recombined by the processing system to merge into a synthesized grayscale image 210 using image addition, whereby values for individual pixels in each output color channel are added together to yield a single grayscale pixel value for the corresponding location within the synthesized image 210, such as shown in FIG. 6.

To extract data from the tire sidewall markings, the synthesized grayscale image 210 is evaluated using an optical character recognition (OCR) process, identifying visible alphanumeric markings and related symbols, such as bar-code elements, snow-flake or winter-tire symbols, and tire rotational direction arrows on the curved tire sidewall surface. The optical character recognition process may be carried out by the processing system, or by a remote processing system, to which the images are communicated, and from which the results are received via a communications network. Identified alphanumeric character sequences and symbols are parsed by the processing system to extract tire data, such as tire size, manufacturer, DOT code, serial numbers, tire style, tire ratings, etc. To compensate for optical character recognition system limitations, a context sensitive spell-check algorithm employing words and phrases commonly found on tire sidewall surfaces may optionally be utilized while parsing the identified character sequences.

Information extracted from the tire sidewall markings may be utilized by the processing system in a variety of ways. For example, information identifying tire size parameters is used to retrieve vehicle specifications from an accessible database, such as a cloud-based vehicle service system, enabling meaningful comparison between measurements acquired by the vehicle inspection system and the retrieved vehicle specifications. The extracted information may additionally be presented to an operator in the form of an electronic communication, report, or visual display, such as in combination with retrieved vehicle specifications and acquired measurements of the moving vehicle. Identifying the currently installed tires on a vehicle facilities a vehicle service facility offering a customer the same replacement tire, an equivalent tire at a different price, a replacement tire with a more aggressive tire tread, or a quieter replacement tire, etc.

While described above in the context of a drive-through vehicle inspection system, one of ordinary skill in the art will recognize that the tire illumination, image capture, and processing techniques described herein can be readily utilized on other vehicle service equipment, such as tire changers and wheel balancers without requiring extensive modification. Balancers and tire changers are advantageously adapted to the present invention by providing stationary support structures for a wheel assembly rotating about a fixed axis of rotation, on which the required illumination sources and imaging systems may be mounted.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for acquiring tire information from a vehicle moving through an inspection lane, comprising:
    activating a plurality of colored light sources to simultaneously illuminate a tire sidewall surface of the moving vehicle as said tire sidewall passes through a field of view of a single imaging sensor;
    acquiring, with said single imaging sensor, a multi-color image of said tire sidewall surface illuminated by said plurality of colored light sources;
    communicating said acquired multi-color image to a processing system configured with image processing software;
    for each colored light source, populating an associated discrete color image plane with pixel elements from said acquired multi-color image corresponding to said colored light source;
    interpolating pixel element values for empty pixel elements within each of said associated discrete color image planes;
    establishing a separate processing channel for each of said discrete color image planes, each of said separate processing channels configured for altering image pixel elements within an associated discrete color image plane to emphasize select image features;
    merging image plane output from each of said separate processing channels to generate a synthesized grayscale image;
    applying an optical character recognition process to said synthesized grayscale image to extract data; and
    parsing said extracted data to retrieve data associated with said tire.

2. The method of claim 1 further including acquiring tire tread depth measurement data from a plurality of tires on said vehicle moving through said vehicle inspection lane; and
    generating a vehicle inspection report containing said acquired tire tread depth measurement data and said retrieved tire data.

3. The method of claim 1 further including acquiring measurements representative of an axle alignment or a wheel alignment for said vehicle moving through said vehicle inspection lane;
    utilizing said retrieved tire data to recall vehicle axle alignment or wheel alignment specification values from an accessible indexed database; and
    evaluating said acquired measurements against said recalled specification values to generate an indication of a vehicle alignment status.

4. The method of claim 1 wherein said plurality of colored light sources include at least one blue light, one red light, and one green light;
    wherein said acquired multi-color image is a Bayer RG image;
    wherein each discrete color image plane is an RGB image for processing in an associated red color channel, green color channel, or blue color channel.

5. The method of claim 1 wherein altering image pixel elements within each of said discrete color image planes includes
    a histogram equalization of pixel values;
    an application of a blurring filter; and
    an application of an edge enhancement filter.

6. The method of claim 5 wherein said histogram equalization is a Contrast Limited Adaptive Histogram Equalization (CLAHE) process.

7. The method of claim 5 wherein said edge enhancement filter is a Sobel filter.

8. The method of claim 1 wherein said synthesized grayscale image is generated by a summation of pixel element values from each of said discrete color image planes output from said separate processing channels.

9. The method of claim 1 wherein said retrieved tire data includes at least one of a tire size, a tire manufacturer, and a tire identifier.

10. An apparatus for acquiring tire information from a vehicle moving through an inspection lane, comprising:

an imaging sensor having a field of view oriented to capture a multi-color image of a tire sidewall surface of the moving vehicle at a predetermined position within said inspection lane;

a plurality of colored light sources disposed to momentarily illuminate said tire sidewall surface at said predetermined position within said inspection lane;

a processing system operatively coupled to said imaging sensor to receive said captured multi-color image, said processing system configured with software instructions to separate said captured multi-color image into a plurality of color image planes, each color image plane corresponding to one of said plurality of colored light sources;

alter image pixel elements within each of said color image planes to emphasize select image features;

generate a synthesized grayscale image by combining said altered color image planes; and perform an optical character recognition analysis on said synthesized image to extract tire identifying information associated with said moving vehicle.

11. The apparatus of claim 10 wherein said extracted identifying tire information includes at least one of a tire size, a tire manufacturer, and a tire identifier.

12. The apparatus of claim 10 further including a trigger mechanism disposed within said inspection lane, said trigger mechanism responsive to a position of said vehicle within said inspection lane to generate a signal to activate said plurality of colored light sources and to trigger said imaging sensor to capture said color image.

13. The apparatus of claim 10 wherein said processing system is further configured to receive tire tread depth measurement data associated with said vehicle from a tire tread depth measurement module within said vehicle inspection lane; and wherein said processing system generates a vehicle inspection report including at least a representation of tire tread depth determined from said received tire tread depth measurement data, together with an identification of at least a tire size for said vehicle determined from said extracted tire identifying information.

14. The apparatus of claim 10 wherein said processing system is further configured to receive wheel alignment or axle alignment data associated with said vehicle from a measurement module within said vehicle inspection lane; and wherein said processing system generates a vehicle inspection report including at least a representation of a vehicle alignment condition determined from said received wheel alignment or axle alignment data, together with an identification of at least a tire size for said vehicle determined from said extracted tire identifying information.

15. The apparatus of claim 10 wherein said plurality of colored light sources include at least one blue light source, one red light source, and one green light source;

wherein each colored light source is spaced about an axis of rotation for the wheel assembly at said predetermined position within said inspection lane and is aligned with an associated optical projection axis oriented at an angle between 45 degrees and 65 degrees relative to said axis of rotation; and wherein said imaging sensor is configured to capture said multi-color image while each of said plurality of colored light sources is simultaneously illuminating said tire sidewall surface from a different spatial orientation.

16. The apparatus of claim 15 wherein at least one of said plurality of colored light sources is positioned longitudinally forward of said wheel assembly axis of rotation at said predetermined position within said inspection lane;

wherein at least one of said plurality of colored light sources is positioned longitudinally rearward of said wheel assembly axis of rotation at said predetermined position within said inspection lane; and wherein at least one of said plurality of colored light sources is positioned vertically above said wheel assembly axis of rotation at said predetermined position within said inspection lane.

17. The apparatus of claim 10 wherein said imaging sensor is configured to capture a multi-color Bayer RG image; and wherein said processing system is configured with software instructions to separate said captured multi-color Bayer RG image into said plurality of color image planes, each corresponding to one of said plurality of colored light sources by generating an RGB image from said Bayer RG image, and separating said RGB image into a red color image plane, a green color image plane, and a blue color image plane for processing along associated color channels.

18. The apparatus of claim 10 wherein said processing system is configured with software instructions to alter one or more of said image pixel elements within each of said plurality of color image planes to emphasize select image features by:

applying a histogram equalization process to pixel values within each color image plane;

applying a blurring filter to each color image plane; and applying an edge enhancement filter to each color image plane.

19. The apparatus of claim 18 wherein said histogram equalization process is a Contrast Limited Adaptive Histogram Equalization (CLAHE) process.

20. The apparatus of claim 18 wherein said edge enhancement filter is a Sobel filter.

21. The apparatus of claim 10 wherein said processing system is configured with software instructions to generate said synthesized image as a grayscale image from said altered color image planes by combining pixel element values from each of said altered color image planes.

\* \* \* \* \*